US006955458B2

(12) United States Patent
Cheema

(10) Patent No.: US 6,955,458 B2
(45) Date of Patent: Oct. 18, 2005

(54) GUTTER SYSTEM WITH BUILT-IN ROPELIGHTS

(76) Inventor: Harjinder S. Cheema, 8151 Barnett Street, Mission, British Columbia (CA), V2V 7C7

(*) Notice: Subject to any disclaimer, the term of this patent is extended or adjusted under 35 U.S.C. 154(b) by 62 days.

(21) Appl. No.: 10/463,693

(22) Filed: Jun. 18, 2003

(65) Prior Publication Data

US 2004/0257801 A1 Dec. 23, 2004

(51) Int. Cl.[7] .................................................. G02B 6/36
(52) U.S. Cl. ....................... 362/581; 362/249; 362/145; 362/152
(58) Field of Search ................................ 362/485, 551, 362/559, 581, 459, 145, 146, 152, 236, 238, 240, 407, 477

(56) References Cited

U.S. PATENT DOCUMENTS

| | | | | |
|---|---|---|---|---|
| 3,204,090 A | | 8/1965 | Kyarda, Jr. | |
| 4,128,863 A | | 12/1978 | Premetz | |
| 4,257,716 A | | 3/1981 | Woodrow | |
| 4,821,158 A | | 4/1989 | Mitten | |
| 4,905,131 A | | 2/1990 | Gary | |
| 5,056,747 A | | 10/1991 | Kireta | |
| 5,141,192 A | | 8/1992 | Adams | |
| 5,311,414 A | * | 5/1994 | Branham, Sr. | 362/249 |
| 5,441,224 A | | 8/1995 | Ludwig | |
| 5,496,005 A | | 3/1996 | Dieringer | |
| 5,510,966 A | | 4/1996 | Konecny | |
| 5,537,785 A | | 7/1996 | Zaccagni | |
| 5,581,956 A | | 12/1996 | Fennessy et al. | |
| 5,594,628 A | | 1/1997 | Reuter et al. | |
| 5,638,643 A | | 6/1997 | Demartini et al. | |
| 5,669,709 A | | 9/1997 | Adams | |
| 5,813,751 A | | 9/1998 | Shaffer | |
| 6,019,488 A | | 2/2000 | Hastings | |
| D427,510 S | | 7/2000 | Gary et al. | |
| 6,123,443 A | * | 9/2000 | Conway | 362/576 |
| 6,152,586 A | * | 11/2000 | Dealey et al. | 362/485 |
| 6,363,662 B1 | | 4/2002 | Coates | |
| 6,364,293 B1 | * | 4/2002 | Beckett | 267/140 |
| 6,494,594 B1 | * | 12/2002 | Schroetter | 362/249 |
| 6,529,664 B1 | * | 3/2003 | Deason | 385/115 |
| 6,560,933 B2 | * | 5/2003 | Richardson | 52/11 |
| 6,644,836 B1 | * | 11/2003 | Adams | 362/396 |
| 2003/0094822 A1 | * | 5/2003 | Hill et al. | 294/19.1 |

FOREIGN PATENT DOCUMENTS

| | | | | |
|---|---|---|---|---|
| DE | 201 00 749 | | 1/2001 | |
| JP | 10068198 A | * | 3/1998 | E04D/13/068 |
| WO | WO 01/57339 | | 8/2001 | |

* cited by examiner

*Primary Examiner*—Stephen Husar
*Assistant Examiner*—Hargobind S. Sawhney
(74) *Attorney, Agent, or Firm*—Oyen Wiggs Green & Mutala LLP

(57) ABSTRACT

A gutter system has decorative ropelights held in a longitudinal groove in the face of the gutter. The groove is adapted to hold a ropelight without using clips or other separate attachment devices. The gutter can also have two or more longitudinal grooves, each holding a ropelight. The system is easy to install on a building and eliminates the need for annual installation and removal of decorative lights.

10 Claims, 3 Drawing Sheets

GUTTER SYSTEM WITH BUILT-IN ROPELIGHTS

FIELD OF THE INVENTION

The invention pertains to gutter systems and exterior lighting systems for buildings. More particularly, it pertains to a system which combines a decorative lighting system in a rain gutter.

BACKGROUND OF THE INVENTION

Decorative lights are commonly installed on the outside of houses and other buildings at Christmas time, often taking the form of strings of lights hung along the eaves. Since rain gutters are commonly installed around the eaves of buildings, adjacent to where seasonal decorative lighting is often installed, it is known in the prior art to associate the two together in some manner. Examples of this are disclosed in U.S. Pat. No. 6,019,488 (Hastings), U.S. Pat. No. 6,363,662 (Coates) and U.S. Pat. No. 3,204,090 (Kvarda, Jr.).

Putting up such lighting systems before Christmas and taking them down afterwards can be a substantial task, and one requiring the use of a ladder and needing to be done at a time of year when the weather is an obstacle to such outdoor work in many locales. It would be desirable to eliminate the requirement for seasonal installation and removal of the lighting system by means of a permanent installation. It would also be desirable to provide a lighting system in which the lights can be mounted easily and permanently adjacent to the eaves of a building.

SUMMARY OF INVENTION

The invention provides a gutter system having decorative ropelights held in a longitudinal groove in the face of the gutter. The groove is sized and configured to receive and retain a ropelight without using clips or other separate attachment devices. The system is easy to install on a building and eliminates the need for annual installation and removal of decorative lights, as the lighting system, though removable from the gutter if desired, is intended to be left in place permanently without the need for removal or for any maintenance other than simple cleaning.

DESCRIPTION OF THE PREFERRED EMBODIMENTS

Figure 1:
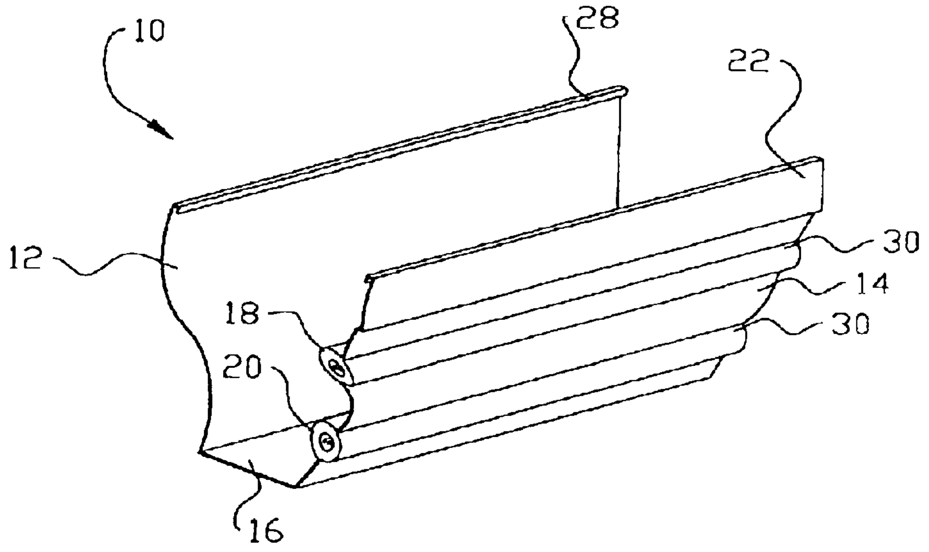
FIG. 1 is a perspective view of a section of the gutter system according to the invention.

Corresponding and like parts are referred to in the following description and indicated in the drawings by the same reference characters.

Figure 2:
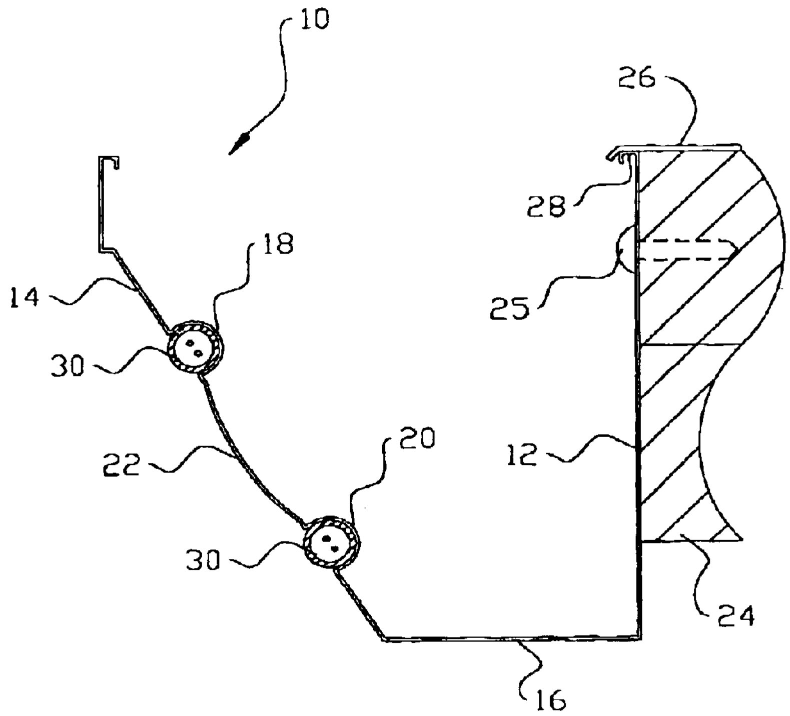
FIG. 2 is a cross-sectional view of the gutter of FIG. 1, attached to the fascia of a building.

Referring to FIGS. 1 and 2, the gutter 10 is a longitudinal trough-like element having a configuration that, apart from the ropelight-retaining grooves, is similar to conventional rain gutters. It is preferably made of aluminum or vinyl and is of any desired length. The gutter has a back wall 12, a front wall 14 and a flat bottom wall 16. In other embodiments, the gutter profile can be a smooth curve from the back wall to the front wall, or V-shaped, without any discrete bottom wall.

Longitudinal grooves 18, 20 are formed in the outer face 22 of the front wall, extending along the length of the gutter and protruding into its inner volume. Grooves 18, 20 are preferably spaced apart. For example, on a five inch high gutter, the grooves could be spaced about two inches apart.

Referring to FIG. 2, in use, gutter 10 is attached to fascia 24 of a building roof, by screws 25 or other conventional means such as nails, with the roof membrane 26 extending over the lip 28 of the back wall 12 so as to permit the flow of rain water into the gutter.

Figure 2A:
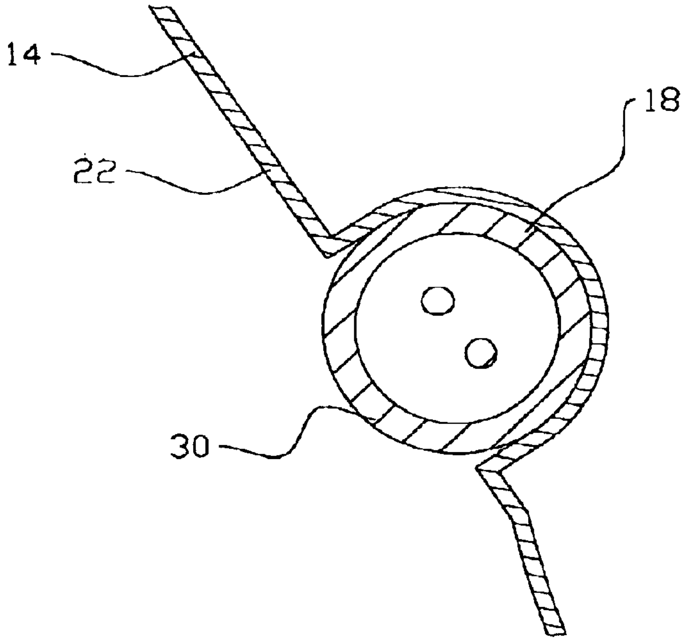
FIG. 2A is a close-up cross-sectional view of the ropelight in a groove of the gutter.

As best seen in FIGS. 2 and 2A, ropelights 30 are fitted in grooves 18, 20, which are sized and configured to receive the ropelight and hold it by means of a snug, frictional fit. Ropelight 30 is preferably a conventional ropelight, comprising a translucent flexible plastic tube containing light-emitting diodes and associated wiring. The grooves 18, 20 are open at the outer face 22 of the gutter and have a depth such that the ropelight is held securely while still being clearly visible when looking at the face of the gutter, so its decorative lighting will be exposed to view. Preferably, the depth of the grooves 18, 20 is greater than the radius of the ropelight, so the ropelight is securely held, and less than the diameter of the ropelight, so the ropelight protrudes somewhat from the face of the gutter for greater visibility of the lights.

Gutter 10 is provided in longitudinal sections of suitable length and, in use, is installed around all or part of the eaves of a house or other building, with the ropelight connected to a source of electric power by conventional means. Lengths of the gutter are connected together by means of clips (not shown in the drawings) which match the profile of the gutter and hold abutting ends of adjacent lengths securely together. Clips for attaching lengths of gutter end to end are well known in the art and such clips, adapted to fit the particular profile of the gutter 10 and not interfere with the fit of the ropelights in the grooves, are used in the present invention.

Figure 3:
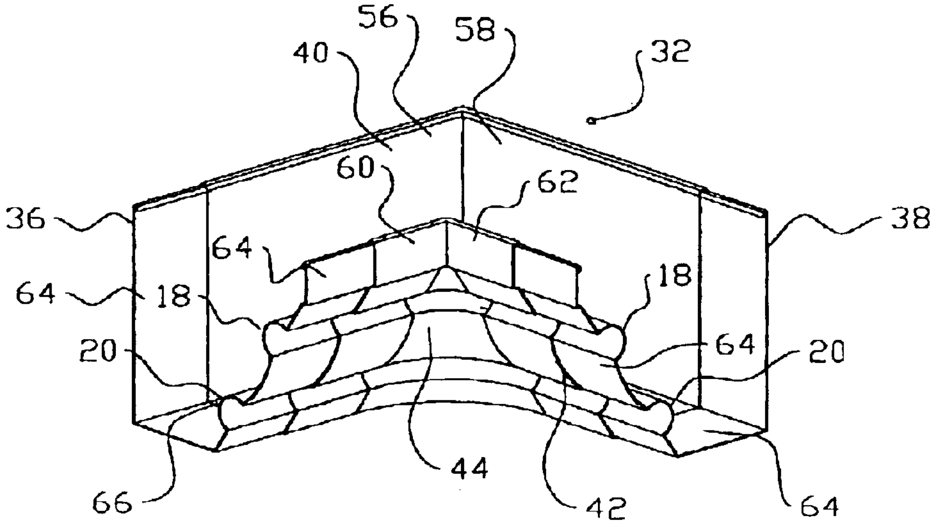
FIG. 3 is a perspective view of an inside corner gutter section.

In order to connect lengths of gutter 10 at the corners of a roof, inside corner section 32 and outside corner section 34 are provided. Referring to FIG. 3, inside corner section 32 has ends 36, 38 which have a profile that is substantially the same as that of gutter 10. The back wall 40 of the corner section forms a right angle (i.e. approximately 90°) between back wall section 56 and back wall section 58. Likewise, front wall 42 forms a right angle between front wall sections 60 and 62. The front wall 42 has a longitudinally curved section 44 that forms a radius of curvature sufficiently large that ropelights in the longitudinal grooves 18, 20 of the corner section can bend about the 90° corner turn while remaining in the grooves.

The edge portions of each end 36, 38 of corner section 32 are stepped inward by approximately the thickness of the gutter material to provide means for overlapping connection to lengths of gutter 10. Referring to FIG. 3, an edge portion 64 of about one-half inch in length of the back wall sections 56, 58, bottom wall 66 and front wall section 60, 62 is stepped inward. A length of gutter 10 can be connected to an end 36, 38 of the corner section 32 by fitting it over portion 64 and sealing with silicon the joint formed between the overlapping outer surface of portion 64 and the inner surface of a gutter length 10. This forms a watertight sealed joint having a flush, contoured profile on the outside. It will be apparent that this mode of attaching a corner section and straight section of gutter can be used even if the gutter and corner sections do not include any ropelight-holding grooves, i.e. the mode of attachment is general in application and can be used to attach prior art gutters at abutting corners.

Figure 4:
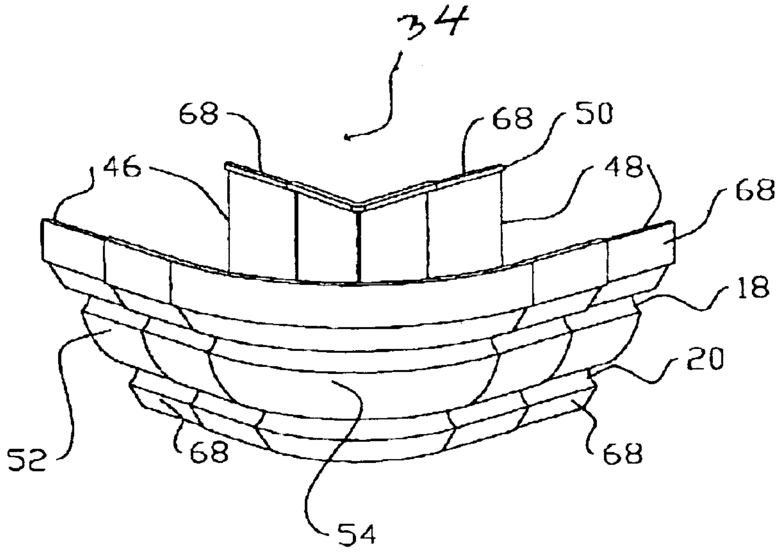
FIG. 4 is a front perspective view of an outside corner gutter section.
Figure 5:
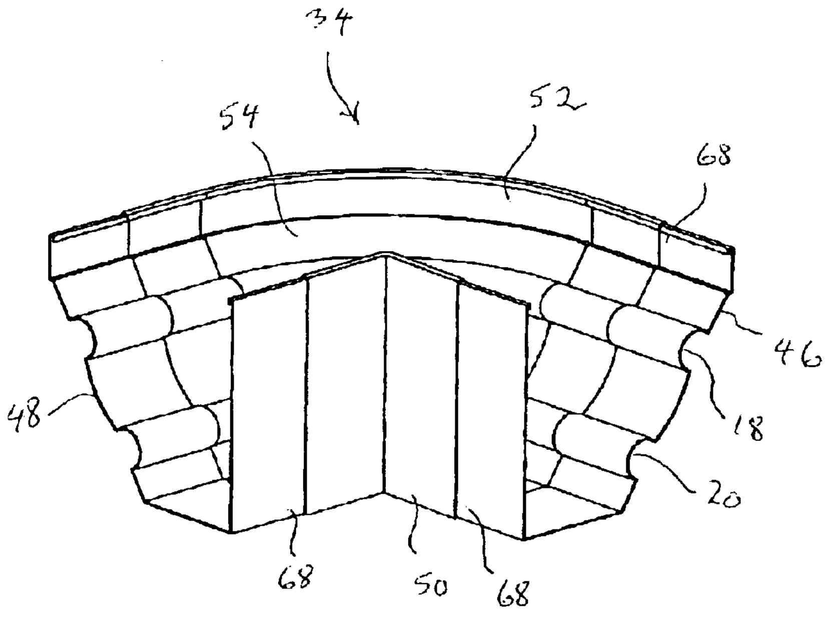
FIG. 5 is a back perspective view of the outside corner gutter section of FIG. 4.

Outer corner section 34, shown in FIGS. 4 and 5, has ends 46, 48 with a profile that is the same as that of gutter 10, such that lengths of the gutter can be abutted to either end 46, 48 of the corner section and secured thereto by means of clips. The back wall 50 of the corner section forms an angle that is approximately 90°. The front wall 52 has a longitudinally curved section 54 that forms a radius of curvature sufficiently large that ropelights in the longitudinal grooves 18, 20 of the corner section can bend about the 90° corner while remaining in the grooves.

The edge portions of each end 46, 48 of corner section 34 are stepped inward, at portion 68, by approximately the thickness of the gutter material, in the same manner as described above for corner section 32, in order to permit the connection of the corner section to gutter lengths 10 by overlapping gutter 10 over portion 64. Again, this mode of connection of lengths of gutter by means of a corner section having edges that are stepped inward does not require the presence of ropelight-holding grooves and is of general application to prior art gutters.

Corner sections 32, 34 are used where lengths of gutter 10 are to be installed at a 90° angle to each other. However, in some applications, other angles of connection, such as 30°, 45°, 60°, 120° and 150° may be required, depending on the roof design, or for applications such as gazebos in corner sections for such uses, the angle of the back walls and respective front walls is made to be whatever is required for a particular application, rather than the 90° corner illustrated in FIGS. 3 and 4. Corner sections according to invention can be provided, having any selected angle at its corner.

The embodiment of the gutter and lighting system described above and illustrated in the drawings has two longitudinal grooves for ropelights. However, the gutter may be made having only one longitudinal groove (for example, groove 18) in the face of the gutter, or with three or more grooves, depending on the amount of decorative lighting desired. In most cases, one, two or three grooves with ropelights will be preferred.

The gutter system of the invention can be installed when constructing a house or installed on an existing house to replace conventional gutters. If desired, a leafguard of types already known in the art can be optionally used in conjunction with the gutter system of the invention to minimize the entry of debris into to the gutter. Also, for roof configurations where a gutter does not extend around the entire roof, the light ropelighting can be continued through non-guttered segments of the fascia by means of a routered groove in the fascia, so the entire roof line can be illuminated.

The gutter system has a very streamlined appearance and is easy to clean, both on the outside of the gutter, since there are no clips or protruding elements attaching the ropelights to the gutter, and on the inside, since the longitudinal grooves do not interfere with the flow of water or debris through the gutter.

As will be apparent to those skilled in the art in the light of the foregoing disclosure, many alterations and modifications are possible in the practice of this invention without departing from the spirit or scope thereof. For example, the gutter can have any practical trough-like profile, so long as it has a front wall portion for the ropelight-retaining grooves. Accordingly, the scope of the invention is to be construed in accordance with the substance defined by the following claims.

What is claimed is:

1. A gutter comprising a gutter trough having a front wall, said front wall of said gutter trough having at least one longitudinal groove formed in its outer face, said groove being shaped and configured to receive a ropelight and to grip and retain said ropelight.

2. A gutter according to claim 1 wherein said front wall has two said longitudinal grooves spaced apart and generally parallel to each other.

3. A gutter according to claim 1 further comprising a ropelight held in said longitudinal groove.

4. A gutter according to claim 1 wherein said groove has a depth that is greater than a radius and less than a diameter of said ropelight.

5. A gutter according to claim 1 wherein said longitudinal groove is generally semi-circular in cross-section.

6. A gutter corner section for connecting longitudinal sections of gutter together at a selected angle, comprising a front wall and a back wall, said back wall forming said angle, said front wall having at least one longitudinal groove formed in its outer face, said groove being shaped and configured to receive a ropelight and to grip and retain said ropelight, said front wall and said longitudinal groove having a longitudinally curved section forming a smooth curve about said angle, whereby said ropelight is guided about said angle while being retained in said groove.

7. A gutter corner section according to claim 6 wherein said angle is about 90°.

8. A gutter corner section according to claim 6, wherein said angle is an angle selected from angles of about 30°, 60°, 120° and 150°.

9. A gutter corner section according to claim 6 wherein said gutter corner section has longitudinal ends that are stepped inward to permit an overlapping connection between a longitudinal section of gutter and said gutter corner section.

10. A gutter corner section according to claim 6 wherein said longitudinal groove is generally semi-circular in cross-section.

* * * * *